UNITED STATES PATENT OFFICE.

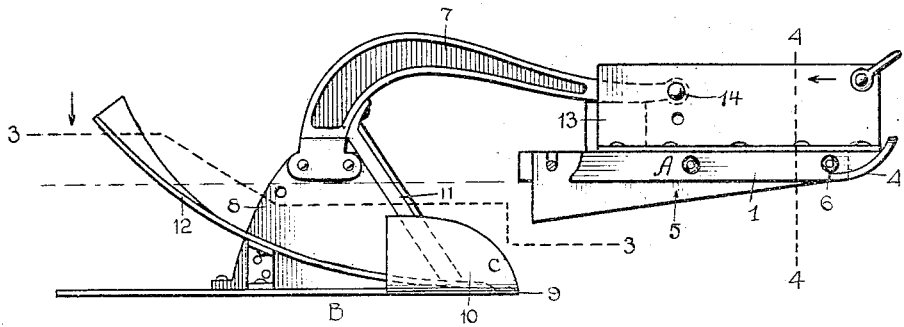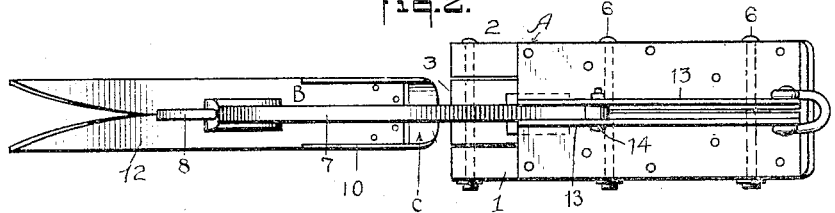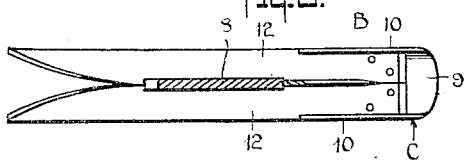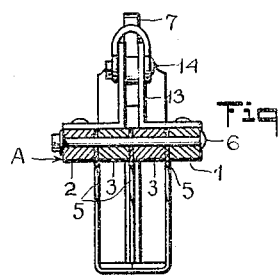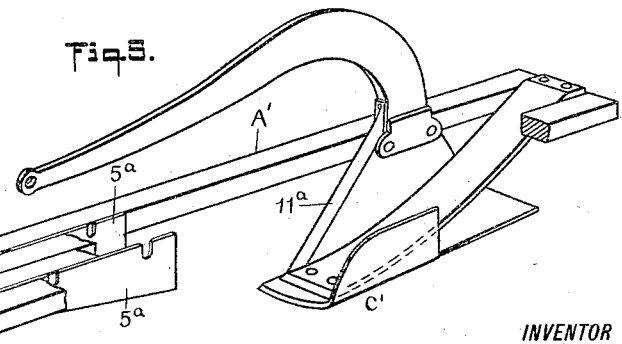

FRANK B. CURRIER, OF JERSEY CITY, NEW JERSEY.

TRENCHING-PLOW.

1,251,186.   Specification of Letters Patent.   Patented Dec. 25, 1917.

Application filed September 15, 1917. Serial No. 191,608.

*To all whom it may concern:*

Be it known that I, FRANK B. CURRIER, a citizen of the United States, and a resident of Jersey City, in the county of Hudson and State of New Jersey, have invented a new and Improved Trenching-Plow, of which the following is a full, clear, and exact description.

This invention relates to a plow for cutting meadow trenches, and relates more particularly to improvements in plows of that type disclosed in the application for United States Letters Patent Serial Number 7,262, filed by me on the tenth day of February, 1915.

The invention has for its general objects to improve the construction and operation of devices of the character referred to so as to be more reliable and efficient in use, comparatively simple and inexpensive to manufacture, and so designed as to insure the maximum amount of work in a given time.

A more specific object of the invention is to provide a novel combination of cutters for cutting out a strip of sod to form a trench without danger of the plow clogging with meadow grass, thereby overcoming one of the objections to my prior construction.

Still another object of the invention is the provision of sod cutters in front of the strip cutters which serve to guide the machine and to cut the sod directly in line with the vertical blades of the strip cutter, so that the danger of clogging of the plow with grass is eliminated.

With such objects in view, and others which will appear as the description proceeds, the invention comprises various novel features of construction and arrangement of parts which will be set forth with particularity in the following description and claims appended hereto.

In the accompanying drawing, which illustrates one embodiment of the invention and wherein similar characters of reference indicate corresponding parts in all the views, Figure 1 is a side view of the plow with a portion of the shoe in section;

Fig. 2 is a plan view;

Fig. 3 is a horizontal section on the line 3—3, Fig. 1;

Fig. 4 is a vertical section on the line 4—4, Fig. 1, and

Fig. 5 is a perspective view of a modified form for cutting the solid strip in the operation of the plow as distinguished from the divided strip cut by the plow shown in Figs. 1 to 4 inclusive.

Referring to the drawing, A designates the shoe or sled-like body of the plow, which body comprises side bars 1 and 2 and two intermediate bars 3. These members of the frame are securely fastened together in any suitable manner. The front end of the shoe A has a curved plate 4 for insuring smooth running of the shoe over the sod. Interposed between the side and intermediate bars 1 and 3 are cutting blades 5 arranged vertically with their lower edges sloping downwardly to the rear, and these blades are clamped in place by the bolts 6, which pass through the bars 1, 2 and 3 and through the blades. These blades serve to cut the sod to the depth of a few inches, and as their cutting edges are gradually inclined there is no danger of grass clogging thereon. These blades make cuts in the sod directly in line with the main cutting means of the plow which cuts out the strip or strips of earth in the forming of a trench. The strip-cutting means B comprises an arched beam 7 which has its rear lower end rigidly fastened to a thin vertical plate 8 that extends downwardly below the plane of the shoe A, and on the bottom of this plate is fastened a scoop-like cutter c having a horizontal blade portion 9 and vertical blade portions 10. The side blades 10 extend upwardly so that their upper edges are slightly above the lowest points of the sod-cutting blades 5, whereby the blades 5 and 10 will cut the side walls of a trench, and the blade 9 will cut the bottom of the trench. In other words, the cutter c is of U-shaped cross-section and open at the top and is disposed wholly below the level of the grass so that there is no danger of grass collecting on the cutter c and causing clogging. Disposed in front of the front edge of the plate 8 is an upwardly extending blade 11 inclined rearwardly and serving the purpose of splitting the strip cut out by the cutter c and blades 5. This cutter 11 is thin and extends upwardly to the arch of the beam and serves to prevent grass from clogging under the arch of the beam. The divided strip is elevated out of the trench by means of elevators in the form of strips 12 which are disposed with their front lower ends within and fastened to the cutter c, and their rear upper ends are curved laterally to deflect the strips. On the top of the shoe are fastened upright plates 13 between which the front end of the beam 7 extends, and the beam is fastened to these plates in any suitable manner, as, for instance, by a bolt 14. With the plow constructed in this manner it is impossible for clogging to occur, since there is a large free open space above and behind the cutter $c$ and at the side of the beam, whereby the strip or strips of sod can readily pass.

The construction shown in Fig. 5 is substantially the same as that shown in the previous figures, with the exceptions that the inclined cutter $11^a$ is disposed at the side of the U-shaped cutter $c'$, and takes the place of one of the cuters 10, and furthermore, only two sod-cutting blades $5^a$ are employed, since this plow cuts a solid instead of a divided strip and the shoe is in the form of a rectangular frame $A'$.

From the foregoing description taken in connection with the accompanying drawing, the advantages of the construction and method of operation will be readily understood by those skilled in the art to which the invention appertains, and while I have described the principle of operation, together with the device which I now consider to be the best embodiment thereof, I desire to have it understood that the device shown is merely illustrative and that such changes may be made when desired as fall within the scope of the appended claims.

Having thus described my invention, I claim as new and desire to secure by Letters Patent:

1. A trenching plow of the class described comprising a shoe adapted to run on the surface of the sod, vertically disposed sod-cutting blades having their bottom cutting edges inclined gradually to the rear, a substantially U-shaped cutter disposed behind the blades and at a lower level to cut the bottom and part of the sides of a trench, an elevator extending from the U-shaped cutter to elevate the strip cut by the plow, a beam connected with the cutter, and means for connecting the beam with the shoe.

2. A trenching plow of the class described comprising a beam, a shoe at the front thereof and adapted to run on the surface of the sod, parallel cutters disposed in a vertical plane, a substantially U-shaped cutter disposed behind the cutters and at a lower level to cut the bottom and part of the sides of a trench after the first-mentioned cutters complete the side cutting of the trench, means for connecting the U-shaped cutter with the beam, an elevator extending from the U-shaped cutter rearwardly and upwardly therefrom, angle members attached to the shoe, and means for adjustably fastening the front end of the beam to the angle members.

3. A trench plow comprising a shoe composed of connected side bars and intermediate bars disposed between the side bars at the front of the shoe, sod-cutting blades clamped between the side and intermediate bars and having bottom cutting edges inclined gradually to the rear and serving to cut part of the side walls of the trench, a U-shaped cutter mounted on the shoe at a point to cut the bottom and part of the side walls of the trench, and means associated with the cutter for elevating the strip of earth cut by the blades and cutter.

FRANK B. CURRIER.

Copies of this patent may be obtained for five cents each, by addressing the "Commissioner of Patents, Washington, D. C."